United States Patent
He

(10) Patent No.: US 9,479,894 B2
(45) Date of Patent: Oct. 25, 2016

(54) LOCATING AND TRACKING SYSTEM

(71) Applicant: iLoda Solutions Limited, Hong Kong (HK)

(72) Inventor: Song He, Hong Kong (HK)

(73) Assignee: ILODA SOLUTIONS LIMITED, Hong Kong (HK)

( * ) Notice: Subject to any disclaimer, the term of this patent is extended or adjusted under 35 U.S.C. 154(b) by 0 days.

(21) Appl. No.: 14/948,408

(22) Filed: Nov. 23, 2015

(65) Prior Publication Data

US 2016/0157050 A1 Jun. 2, 2016

Related U.S. Application Data

(60) Provisional application No. 62/085,350, filed on Nov. 28, 2014.

(51) Int. Cl.
| | |
|---|---|
| *H04W 72/04* | (2009.01) |
| *H04W 4/00* | (2009.01) |
| *H04W 76/02* | (2009.01) |
| *H04W 84/18* | (2009.01) |
| *H04W 88/14* | (2009.01) |

(52) U.S. Cl.
CPC ............ *H04W 4/008* (2013.01); *H04W 76/02* (2013.01); *H04W 84/18* (2013.01); *H04W 88/14* (2013.01)

(58) Field of Classification Search
USPC .............. 455/456.1, 456.6, 556.1, 566, 502, 455/414.1, 456.3; 370/468, 338, 238, 256, 370/311, 329, 221, 255, 350
See application file for complete search history.

(56) References Cited

U.S. PATENT DOCUMENTS

| | | | |
|---|---|---|---|
| 8,767,771 | B1 | 7/2014 | Shukla et al. |
| 2004/0136338 | A1 | 7/2004 | Lin et al. |
| 2004/0193449 | A1 | 9/2004 | Wildman et al. |
| 2010/0085930 | A1* | 4/2010 | Shin ................ H04W 72/1278 370/329 |
| 2013/0275791 | A1* | 10/2013 | Ulmer .................. G06F 1/3234 713/323 |
| 2014/0087752 | A1 | 3/2014 | Zhu et al. |
| 2014/0098658 | A1* | 4/2014 | Johansen ............... H04L 45/00 370/221 |
| 2014/0135042 | A1* | 5/2014 | Buchheim ................ G01S 1/68 455/456.6 |
| 2014/0148196 | A1* | 5/2014 | Bassan-Eskenazi .... G01S 11/02 455/456.1 |
| 2014/0220883 | A1 | 8/2014 | Emigh et al. |

OTHER PUBLICATIONS

Search Report of U.S. Appl. No. 62/085,350 issued by the Chinese Patent Office on May 26, 2015.
Steve Cheney, How Apple iBeacon Will Transform Local Commerce, Technology, Business & Strategy, Oct. 1, 2013.

\* cited by examiner

*Primary Examiner* — Ganiyu A Hanidu

(57) ABSTRACT

A locating and tracking system includes: at least one monitoring device; and a plurality of Bluetooth low energy (BLE) devices acting as either backbone nodes or tracking nodes. The backbone nodes are connected with each other and form a mesh network to relay information to the monitoring device in mesh mode so that the monitoring device knows all the backbone nodes' presence and locations. Each backbone node is further connected with a plurality of tracking nodes to form a sub-network. Within the sub-network, the backbone node is configured to operate in beacon mode to periodically check presence of all the tracking nodes and other compatible BLE devices within its coverage.

20 Claims, 8 Drawing Sheets

LOCATING AND TRACKING SYSTEM

FIELD OF THE PATENT APPLICATION

The present patent application generally relates to information technologies and more specifically to a locating and tracking system utilizing hybrid modes of Bluetooth devices that support both Bluetooth mesh technology and Bluetooth beacon technology.

BACKGROUND

Bluetooth is a wireless technology standard for exchanging data over short distances (using short-wavelength UHF radio waves in the ISM band from 2.4 to 2.485 GHz) from fixed and mobile devices and building personal area networks (PANs). Bluetooth low energy (BLE), previously known as Wibree™, is a subset of Bluetooth v4.0 with an entirely new protocol stack for rapid build-up of simple links. As an alternative to the Bluetooth standard protocols that were introduced in Bluetooth v1.0 to v3.0, it aims at very low power applications running off a coin cell. Bluetooth or BLE is an open standard technology. BLE is a low power consumption wireless communication technology.

Bluetooth mesh technology is a new protocol built on BLE. It connects a plurality of BLE devices using a mesh topology to form a network where each node in the network is connected to every other node around it. Each device can communicate with each other and exchange data. CSR has announced its Bluetooth mesh technology. Mesh technology is often used to connect all devices together to transfer information.

Bluetooth beacon technology is also a new protocol built on BLE. It consists of one or more Bluetooth beacons that transmit their own unique identification numbers to the local area. A receiving device with suitable software may then look up the beacons and perform various functions, such as notifying a user. Receiving devices can also connect to the beacons to retrieve values from beacon's GATT (generic attribute profile) service. Apple has announced its version of beacon technology called iBeacon. Beacon is often used to provide location information to a receiving device.

SUMMARY

The present patent application is directed to a locating and tracking system. In one aspect, the locating and tracking system includes: at least one monitoring device; and a plurality of Bluetooth low energy (BLE) devices acting as either backbone nodes or tracking nodes. The backbone nodes are connected with each other and form a mesh network to relay information to the monitoring device in mesh mode so that the monitoring device knows all the backbone nodes' presence and locations. Each backbone node is further connected with a plurality of tracking nodes to form a sub-network. Within the sub-network, the backbone node is configured to operate in beacon mode to periodically check presence of all the tracking nodes and other compatible BLE devices within its coverage. When being in mesh mode, the backbone nodes are configured to relay information to other backbone nodes until the information reaches the monitoring device. When being in beacon mode, the backbone nodes are configured to actively broadcast their own universal unique identifiers (UUIDs) and seek to establish connections with all BLE devices within its range. The backbone nodes are configured to store the UUIDs of all devices detected in their memories. The tracking nodes are configured to operate in a sleep mesh mode and sleep except replying to the backbone nodes' queries and requests by comparing UUID received and stored in memories of the tracking nodes.

When taken away from its position or restored back to its position, and falling into any backbone node's covered area, each tracking node may be configured to switch into an actively listening mesh mode, in which the tracking node is configured to simultaneously listen to any backbone node's broadcast and attempt to establish connections with any backbone node in order to send its UUID back to the monitoring device. If time that the tracking node has stayed in the actively listening mesh mode exceeds a limit, and the tracking node still cannot find a nearby backbone node, the tracking node may be configured to switch itself into beacon mode and actively broadcast its UUID seeking to be found by the monitoring device. The backbone nodes may be configured to operate in mesh mode and beacon mode simultaneously. Each backbone node may include two BLE devices which work in mesh mode and beacon mode respectively. The two BLE devices may share a same memory that contains UUID. A memory lock control signal may be used to ensure that only one BLE device can access the memory at one time.

The backbone nodes may be configured to automatically switch between mesh mode and beacon mode with a predefined time pattern. Each backbone node may include only one BLE device. The BLE device may include a protocol stack that is compatible with both Bluetooth mesh protocol and Bluetooth beacon protocol. The backbone nodes may be configured to communicate with each other through a synchronization method. The method includes: the monitoring device sending out a switch signal to the closest backbone node to switch the closest backbone node to mesh mode; the closest backbone node sending the switch signal to a next backbone node to switch the next backbone node to mesh mode; and when the monitoring device has received an updated UUID table from the closest backbone node, the monitoring device sending another switch signal to switch all backbone nodes to beacon mode.

The backbone nodes may be configured to communicate with each other through a synchronization method. The method includes: the monitoring device sending out a switch or training sequence signal to the closest backbone node to switch the closest backbone node to mesh mode; the closest backbone node sending the switch or training sequence signal to a next backbone node to switch the next backbone node to mesh mode; synchronizing clocks in all backbone nodes with the switch or training sequence signal; and after a predefined time, automatically changing all backbone nodes back to beacon mode.

In another aspect, the present patent application provides a locating and tracking system that includes: at least one monitoring device; and a plurality of Bluetooth low energy (BLE) devices acting as either backbone nodes or tracking nodes. The backbone nodes are connected with each other and form a mesh network to relay information to the monitoring device in mesh mode so that the monitoring device knows all the backbone nodes' presence and locations. Each backbone node is further connected with a plurality of tracking nodes to form a sub-network. Within the sub-network, the backbone node is configured to operate in beacon mode to periodically check presence of all the tracking nodes and other compatible BLE devices within its coverage. The backbone nodes are configured to switch between mesh mode and beacon mode.

The backbone nodes may be configured to operate in mesh mode and beacon mode simultaneously. Each backbone node may include two BLE devices which work in mesh mode and beacon mode respectively. The two BLE devices may share a same memory that contains UUID. A memory lock control signal may be used to ensure that only one BLE device can access the memory at one time.

The backbone nodes may be configured to automatically switch between mesh mode and beacon mode with a predefined time pattern. Each backbone node may include only one BLE device. The BLE device may include a protocol stack that is compatible with both Bluetooth mesh protocol and Bluetooth beacon protocol.

In yet another aspect, the present patent application provides a locating and tracking system that includes: at least one monitoring device; and a plurality of Bluetooth low energy (BLE) devices acting as either backbone nodes or tracking nodes. The backbone nodes are connected with each other and form a mesh network to relay information to the monitoring device in mesh mode so that the monitoring device knows all the backbone nodes' presence and locations. Each backbone node is further connected with a plurality of tracking nodes to form a sub-network. Within the sub-network, the backbone node is configured to operate in beacon mode to periodically check presence of all the tracking nodes and other compatible BLE devices within its coverage.

The tracking nodes may be equipped with sensors, switches, buzzers, or lights. When being in mesh mode, the backbone nodes may be configured to relay information to other backbone nodes until the information reaches the monitoring device. When being in beacon mode, the backbone nodes may be configured to actively broadcast their own universal unique identifiers (UUIDs) and seek to establish connections with all BLE devices within its range. The backbone nodes may be configured to store the UUIDs of all devices detected in their memories.

The tracking nodes may be configured to operate in a sleep mesh mode and sleep except replying to the backbone nodes' queries and requests by comparing UUID received and stored in memories of the tracking nodes. When taken away from its position or restored back to its position, and falling into any backbone node's covered area, each tracking node may be configured to switch into an actively listening mesh mode, in which the tracking node is configured to simultaneously listen to any backbone node's broadcast and attempt to establish connections with any backbone node in order to send its UUID back to the monitoring device.

If time that the tracking node has stayed in the actively listening mesh mode exceeds a limit, and the tracking node still cannot find a nearby backbone node, the tracking node may be configured to switch itself into beacon mode and actively broadcast its UUID seeking to be found by the monitoring device. The backbone nodes may be configured to operate in mesh mode and beacon mode simultaneously. Each backbone node may include two BLE devices which work in mesh mode and beacon mode respectively. The two BLE devices may share a same memory that contains UUID. A memory lock control signal may be used to ensure that only one BLE device can access the memory at one time.

The backbone nodes may be configured to automatically switch between mesh mode and beacon mode with a predefined time pattern. Each backbone node may include only one BLE device. BLE device may include a protocol stack that is compatible with both Bluetooth mesh protocol and Bluetooth beacon protocol.

The backbone nodes may be configured to communicate with each other through a synchronization method. The method includes: the monitoring device sending out a switch signal to the closest backbone node to switch the closest backbone node to mesh mode; the closest backbone node sending the switch signal to a next backbone node to switch the next backbone node to mesh mode; and when the monitoring device has received an updated UUID table from the closest backbone node, the monitoring device sending another switch signal to switch all backbone nodes to beacon mode.

The backbone nodes may be configured to communicate with each other through a synchronization method. The method includes: the monitoring device sending out a switch or training sequence signal to the closest backbone node to switch the closest backbone node to mesh mode; the closest backbone node sending the switch or training sequence signal to a next backbone node to switch the next backbone node to mesh mode; synchronizing clocks in all backbone nodes with the switch or training sequence signal; and after a predefined time, automatically changing all backbone nodes back to beacon mode.

BRIEF DESCRIPTIONS OF THE DRAWINGS

DETAILED DESCRIPTION

Reference will now be made in detail to a preferred embodiment of the locating and tracking system disclosed in the present patent application, examples of which are also provided in the following description. Exemplary embodiments of the locating and tracking system disclosed in the present patent application are described in detail, although it will be apparent to those skilled in the relevant art that some features that are not particularly important to an understanding of the locating and tracking system may not be shown for the sake of clarity.

Furthermore, it should be understood that the locating and tracking system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
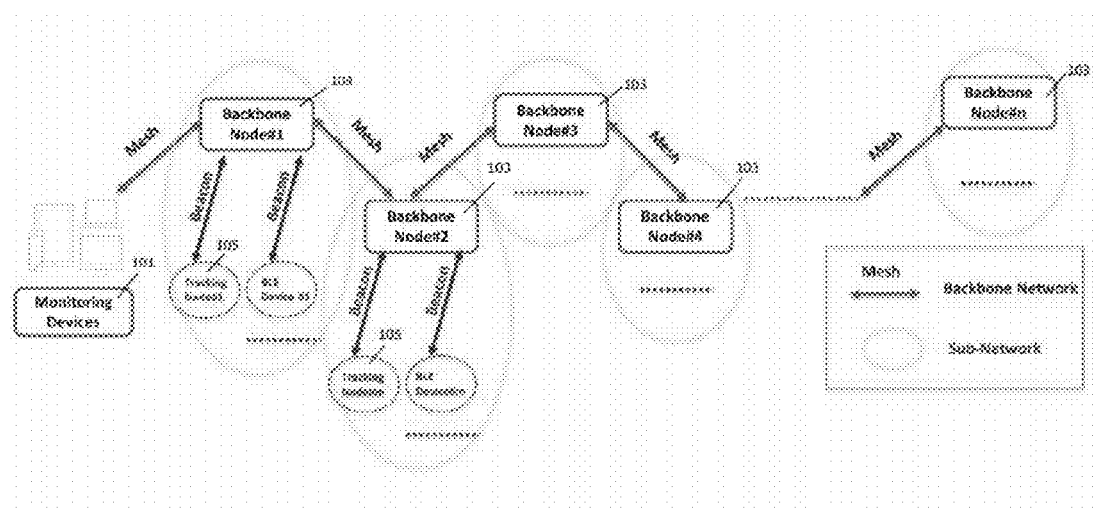
FIG. 1 illustrates a locating and tracking system in accordance with an embodiment of the present patent application.

FIG. 1 illustrates a locating and tracking system in accordance with an embodiment of the present patent application. Referring to FIG. 1, the locating and tracking system includes a plurality of monitoring devices 101, a plurality of BLE devices 103 acting as backbone nodes, and a plurality of BLE devices 105 acting as tracking nodes. The plurality of BLE devices 103 are connected with each other, and with the monitoring devices 101. Each backbone node 103 is connected with connected with the tracking nodes 105.

A method of forming the above locating and tracking system includes:

Step 1: Forming a backbone network using BLE devices 103 as backbone nodes

The BLE devices 103 used as backbone nodes are connected with each other using mesh technology and thereby forming a mesh network to relay information (tracking nodes' universal unique identifiers (UUIDs), etc.) to the monitoring devices 101 in mesh mode so that the monitoring devices 101 know (i.e. can perceive) all the backbone nodes' presence and locations.

Step 2: Forming a sub-network using BLE devices 105 as tracking nodes

Each backbone node 103 is further connected with the tracking nodes 105 to form a sub-network. Within the sub-network, the backbone node 103 can operate in beacon mode to periodically check the presence of all tracking nodes 105 and other compatible Bluetooth devices within its coverage, and relay such information to the monitoring devices 101 as aforementioned. By attaching with the tracking node 105, an item or a person can be tracked and located within the sub-network.

Figure 2:
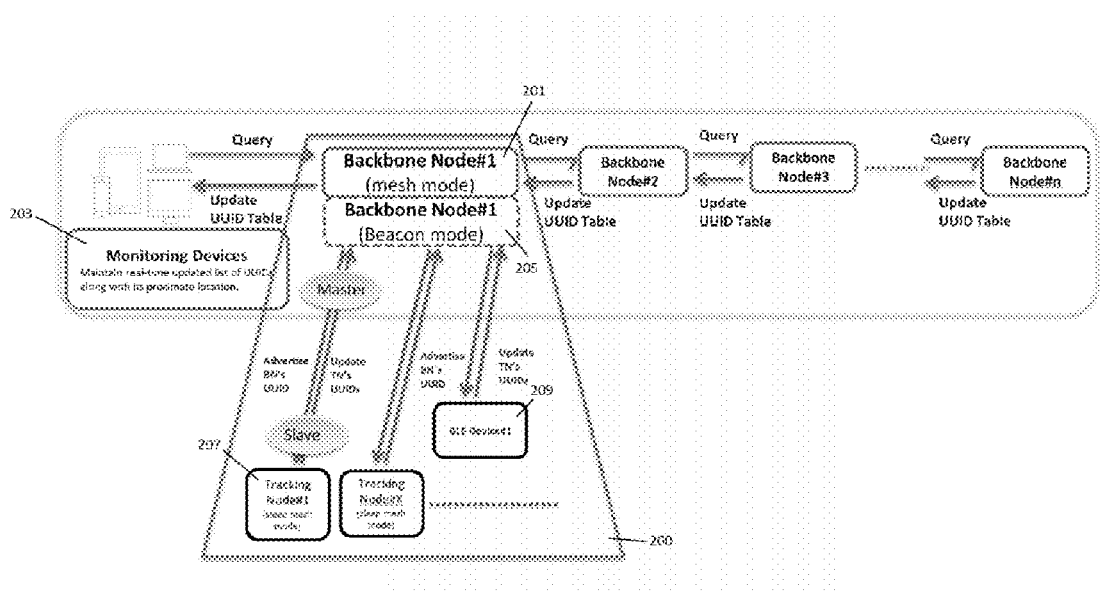
FIG. 2 shows the backbone nodes of the locating and tracking system depicted in FIG. 1 in either mesh mode or beacon mode.

The system in this embodiment includes a plurality of monitoring devices 101, however, it is understood that in an alternative embodiment, the system may include only one monitoring device. Each BLE device 103 in the locating and tracking system operates in mesh mode and beacon mode. FIG. 2 shows the backbone nodes of the locating and tracking system depicted in FIG. 1 in either mesh mode or beacon mode. Referring to FIG. 2, when a backbone node 201 is in mesh mode, it relays information to other backbone nodes until the information reaches the monitoring devices 203. When a backbone node 205 is in beacon mode, it actively broadcasts its own UUID and seeks to establish connections with all BLE devices (a tracking node 207 or any compatible BLE device 209) within its range. The backbone node 205 stores the UUIDs of all devices detected in its memory. Each tracking node's UUID has an associated backbone node UUID to indicate its location. For the sub-network 200, all tracking nodes and compatible BLE devices are tracked and located by reading their UUIDs and estimating their positions from the backbone nodes by analyzing the RF signals.

Figure 3:
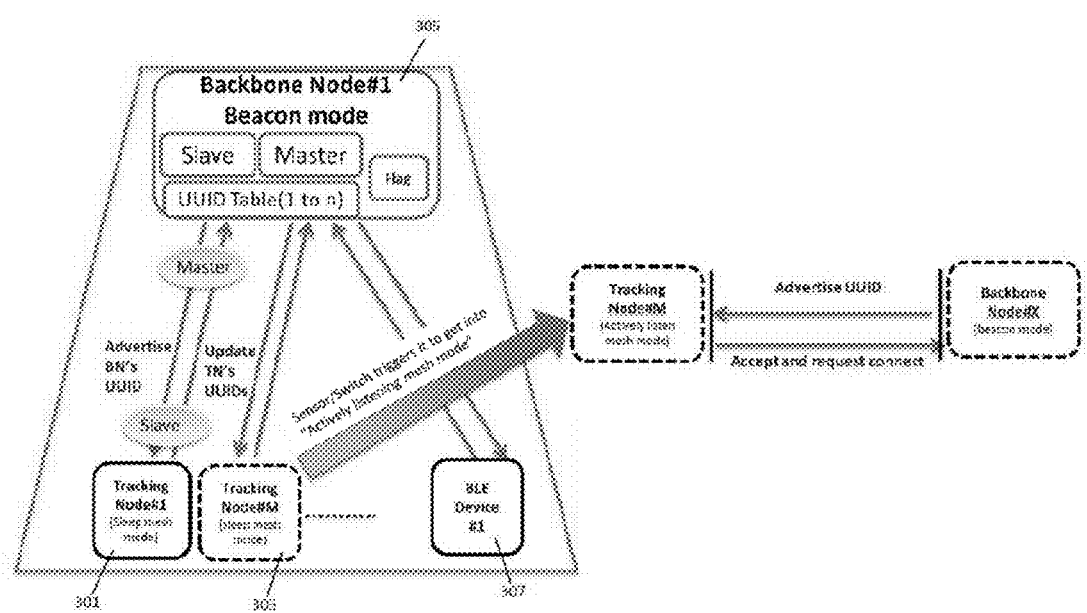
FIG. 3 shows a tracking node being switched to "actively listening mesh mode" by a sensor or a switch.

The tracking nodes also operate in mesh mode and beacon mode. The mesh mode is further divided into "sleep mesh mode" and "actively listening mesh mode" to control the time spent on communication in order to reduce power consumption and extend tracking nodes' battery life. It is noted that in this embodiment, the tracking nodes are equipped with sensors, switches, buzzers, and/or lights. FIG. 3 shows a tracking node being switched to "actively listening mesh mode" by a sensor or a switch. Referring to FIG. 3, the tracking nodes 301 and 303 mostly work in "sleep mesh mode" in which they sleep most of the time and only reply to the backbone node's queries and their associated backbone node's request by comparing UUID received and stored in their memories. This is to avoid interference problem (tracking node might be receiving signals from multiple backbone nodes) and to reduce power consumption. All other compatible BLE devices in the sub-network can also be located by replying to the backbone node's beacon request.

When a tracking node is going through some environment changes, e.g. taken away from its position or restored back to its position, this tracking node is considered as a mobile node and may fall into any backbone nodes' covered area. A sensor or a switch will change this mobile node into an "actively listening mesh mode", in which the mobile node simultaneously listens to any backbone nodes' broadcast and tries to establish connections with any backbone nodes in order to send its UUID back to the monitoring devices.

Referring to FIG. 3, when the backbone node 305 is in beacon mode, it actively broadcasts its UUID to all tracking nodes such as 301 and 303, and compatible BLE devices such as BLE device 307. All tracking nodes are configured to answer the query from the backbone node 305 and confirm its UUID. The backbone's UUID table has a list of all tracking nodes' UUIDs that is updated in real time.

It is noted that a backbone node (BN) is a fixed node while a tracking node (TN) can be a mobile node. An accelerometer may be used to trigger a switch when the node is moving at an accelerated speed. NFC may be used to trigger a switch if the node leaves its fixed position.

Figure 4:
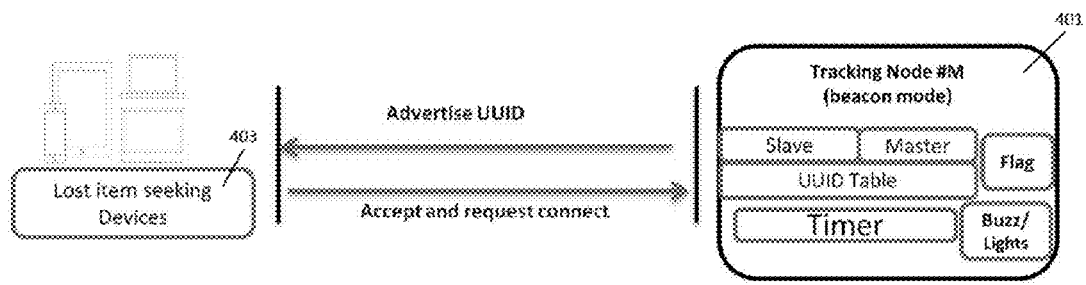
FIG. 4 shows a tracking node switching to beacon mode.

FIG. 4 shows a tracking node switching to beacon mode. Referring to FIG. 4, if the time that the mobile node 401 has stayed in the "actively listening mesh mode" exceeds a limit and the mobile node 401 still cannot find a nearby backbone node, this mobile node 401 is likely to be lost or out of the network coverage. The mobile node 401 then switches itself into beacon mode and actively broadcasts its UUID seeking to be found by "lost item seeking" devices 403, e.g. a smart phone or tablet. The mobile node 401 may also be configured to turn on its buzz/lights on the device to help itself be found.

Figure 5:
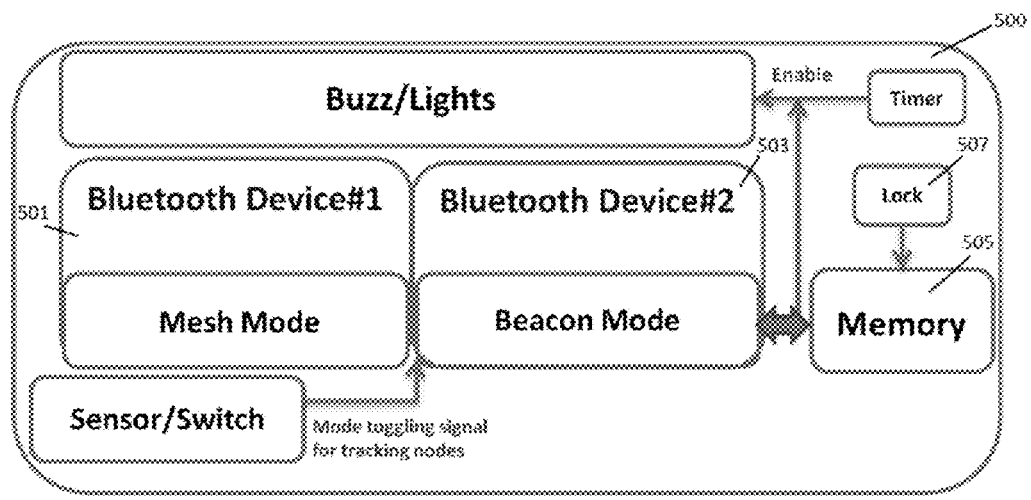
FIG. 5 is a block diagram of a fully duplexed backbone network in accordance with an embodiment of the present patent application.
Figure 6:
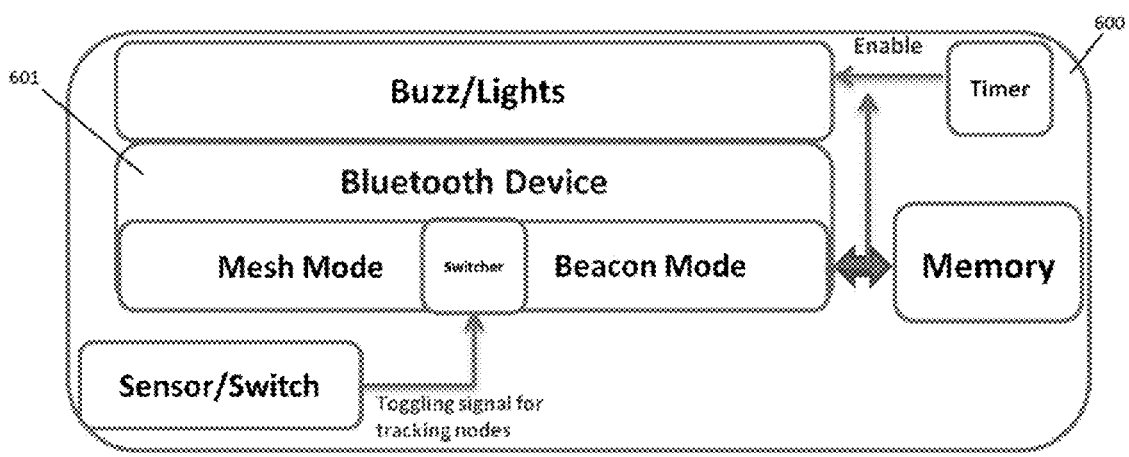
FIG. 6 is a block diagram of a time-switch duplexed backbone network in accordance with another embodiment of the present patent application.

FIG. 5 is a block diagram of a fully duplexed backbone network in accordance with an embodiment of the present patent application. FIG. 6 is a block diagram of a time-switch duplexed backbone network in accordance with another embodiment of the present patent application. FIGS. 5 and 6 illustrate two ways to switch backbone nodes between mesh mode and beacon mode, namely a fully duplexed backbone network and a time-switch duplexed backbone network.

In a fully duplexed backbone network as shown in FIG. 5, the backbone node 500 works in mesh mode and beacon mode simultaneously. Each backbone node 500 includes two BLE devices 501 and 503, which work in mesh mode and beacon mode respectively. These two BLE devices 501 and 503 share the same memory 505 that contains the UUID. Since both devices 501 and 503 can read/write on the same memory 505 at the same time, a "memory lock" control signal 507 is used to ensure that only one BLE device can access the memory at one time.

In a time-switch duplexed backbone network as shown in FIG. 6, the backbone node 600 automatically switches between mesh mode and beacon mode with a predefined time pattern. Therefore, only one BLE device 601 which supports both mesh mode and beacon mode is included in each backbone node 600. The BLE device has a protocol stack that is compatible with both Bluetooth mesh protocol and Bluetooth beacon protocol.

Since a backbone node in mesh mode can only communicate with another backbone node also in mesh mode, the backbone nodes in a time-switch duplexed backbone network need to have a synchronization method to properly communicate with each other. FIGS. 7-10 are block diagrams illustrating two synchronization methods.

Figure 7:
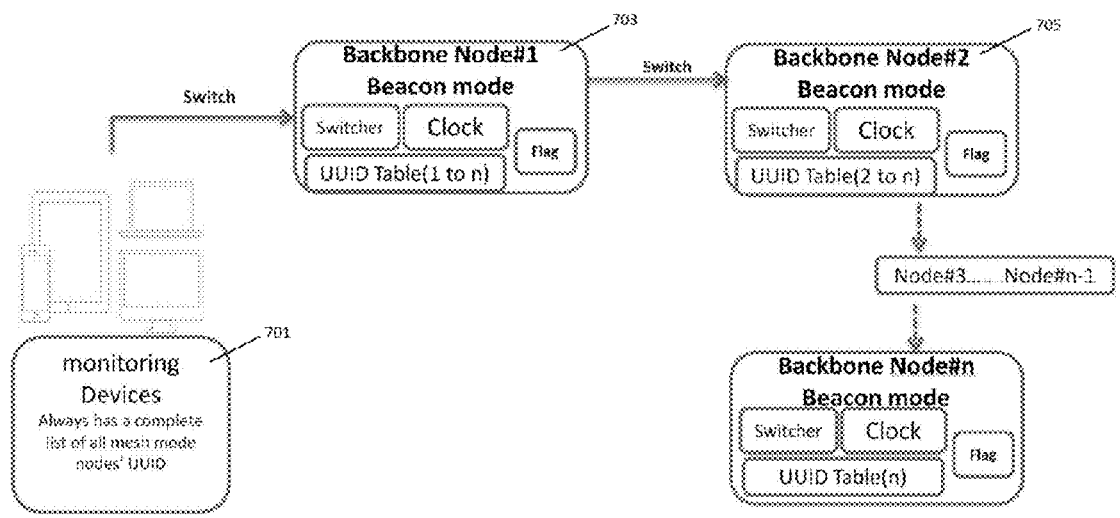
FIG. 7 shows a monitoring device switching all backbone nodes to mesh mode in accordance with an embodiment of the present patent application.
Figure 8:
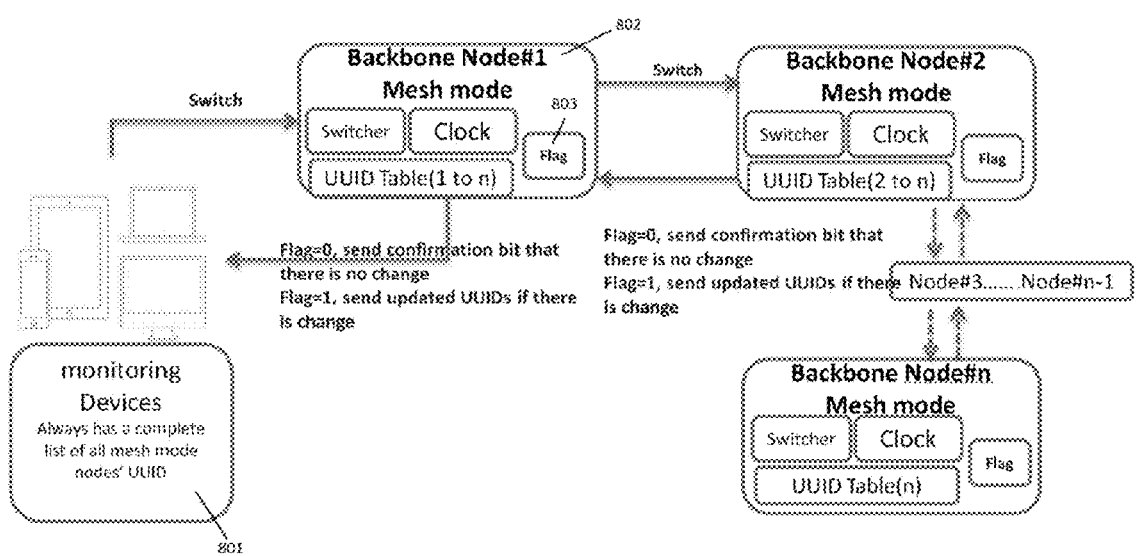
FIG. 8 shows a monitoring device switching all backbone nodes to beacon mode in accordance with the embodiment depicted in FIG. 7.

FIG. 7 shows a monitoring device switching all backbone nodes to mesh mode in accordance with an embodiment of the present patent application. FIG. 8 shows a monitoring device switching all backbone nodes to beacon mode in accordance with the embodiment depicted in FIG. 7. Referring to FIG. 7, the monitoring devices 701 send out a "switch" signal to the closest backbone node 703 to switch it to mesh mode. Then, the backbone node 703, which is the closest to the monitoring devices 701 sends the "switch" signal to the next node 705 to switch it to mesh mode. Referring to FIG. 8, when the monitoring device 801 receives the updated UUID table from the nearest node 802, it is configured to send another "switch" signal to switch all nodes to beacon mode. It is noted that in this embodiment, a 1-bit flag 803 is configured to indicate if the UUID table has updates or not. The node 802 is configured to only transfer updated UUID table. If the flag=0, then the backbone node 802 is configured to send confirmation bit indicating that there is no change. If the flag=1, then the backbone node 802 is configured to send updated UUIDs if there is change.

Figure 9:
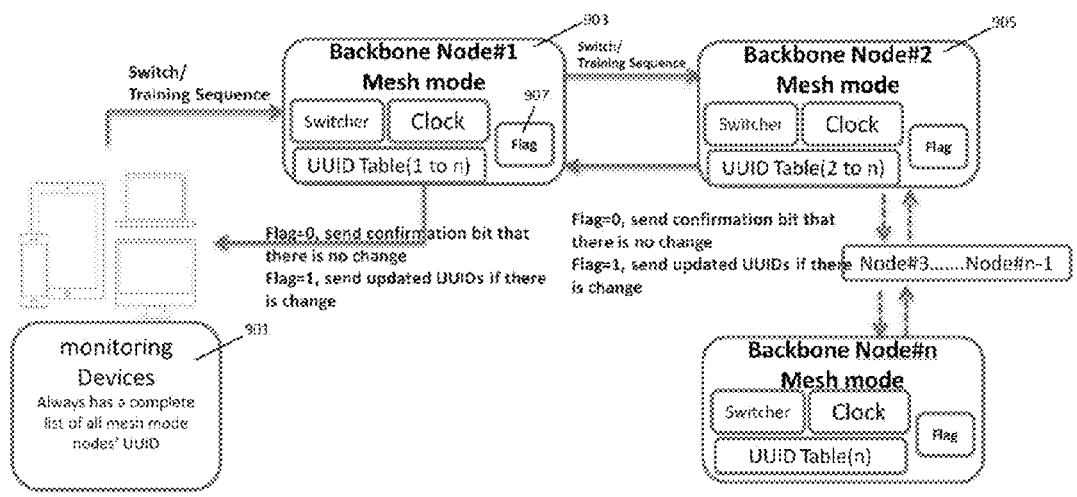
FIG. 9 shows a monitoring device switching all backbone nodes to mesh mode and synchronizing their clocks in accordance with another embodiment of the present patent application.
Figure 10:
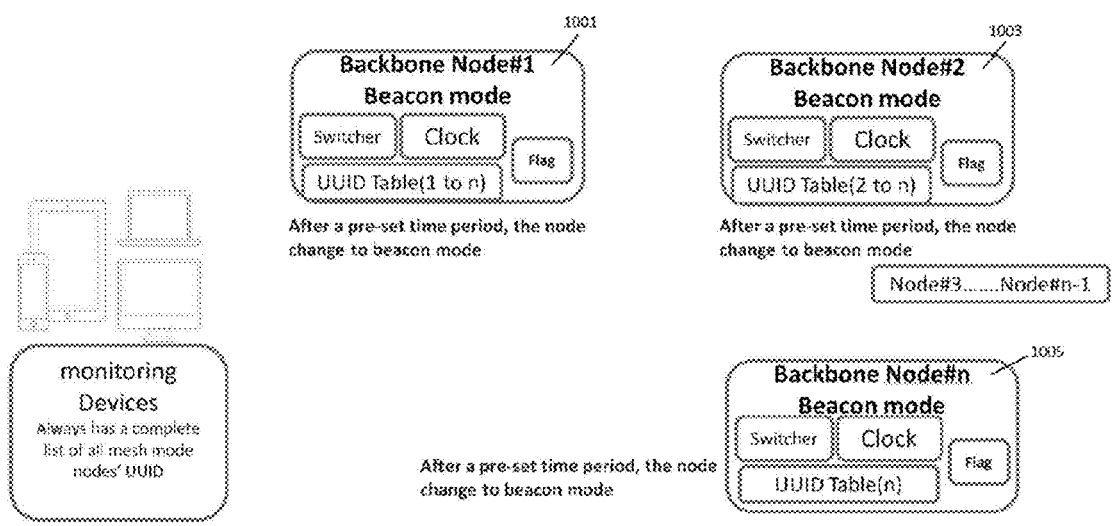
FIG. 10 shows all backbone nodes switching back to beacon mode after a pre-set time period in accordance with the embodiment depicted in FIG. 9.

FIG. 9 shows a monitoring device switching all backbone nodes to mesh mode and synchronizing their clocks in accordance with another embodiment of the present patent application. FIG. 10 shows all backbone nodes switching back to beacon mode after a pre-set time period in accordance with the embodiment depicted in FIG. 9. FIGS. 9 and 10 illustrate another synchronization method to make sure that all backbone nodes are in mesh mode at the same time or in beacon mode at the same time. Referring to FIG. 9, the monitoring devices 901 send out a "switch/training sequence" signal to the closest backbone node 903 to switch it to mesh mode. The backbone node 903 closest to the monitoring devices 901 then sends the "switch" signal to the next node 905 to switch it to mesh mode. A training sequence is used to synchronize the clock in all these backbone nodes. Referring to FIG. 10, after a predefined time, all backbone nodes, such as the backbone nodes 1001, 1003 and 1005 automatically change back to beacon mode. It is noted that in this embodiment, a 1-bit flag 907 is configured to indicate if the UUID table has updates or not. The node 903 is configured to only transfer updated UUID table. If the flag=0, then the backbone node 903 is configured to send confirmation bit indicating that there is no change. If the flag=1, then the backbone node 903 is configured to send updated UUIDs if there is change.

The above embodiments provide a locating and tracking system including a plurality of BLE devices which support both Bluetooth mesh technology and Bluetooth beacon technology to form an always connected network. Real-time tracking and locating of all BLE devices within the network can be achieved.

The locating and tracking system provided by the above embodiments may be used to locate and track all items/human attached with the tracking node or compatible BLE devices in a local area. Its applications include but are not limited to the following.

A potential application of the system is to locate and track important asset in a local area. With just a group of BLE devices and a monitoring device, the system allows all assets to be tracked and located. All assets' movements can also be monitored. When an asset is lost, the system also provides a way to recover it.

A potential application of the system is to locate and track human in a local area. With just a group of BLE devices and a monitoring device, the system allows all human to be tracked and located. All human' movements can also be monitored. When a human is lost, the system also provides a way to find it.

A potential application of the system is to locate and track all items in a warehouse or retail shop. With just a group of BLE devices and a monitoring device, the system allows all items to be tracked and located. All items' movements can also be monitored. When an item is lost, the system also provides a way to find it.

A potential application of the system is to locate and track all items in a home. With just a group of BLE devices and a monitoring device, the system allows all items to be tracked and located. All items' movements can also be monitored. When an item is lost, the system also provided a way to find it. Furthermore, with added sensor and control device, the system can also be used to control all appliances or other items within a home.

While the present patent application has been shown and described with particular references to a number of embodiments thereof, it should be noted that various other changes or modifications may be made without departing from the scope of the present invention.

What is claimed is:

1. A locating and tracking system comprising:
   at least one monitoring device; and
   a plurality of Bluetooth low energy (BLE) devices acting as either backbone nodes or tracking nodes; wherein:
   the backbone nodes are connected with each other and form a mesh network to relay information to the monitoring device in mesh mode so that the monitoring device knows all the backbone nodes' presence and locations;
   each backbone node is further connected with a plurality of tracking nodes to form a sub-network;
   within the sub-network, the backbone node is configured to operate in beacon mode to periodically check presence of all the tracking nodes and other compatible BLE devices within its coverage;
   when being in mesh mode, the backbone nodes are configured to relay information to other backbone nodes until the information reaches the monitoring device;
   when being in beacon mode, the backbone nodes are configured to actively broadcast their own universal unique identifiers (UUIDs) and seek to establish connections with all BLE devices within its range;
   the backbone nodes are configured to store the UUIDs of all devices detected in their memories; and
   the tracking nodes are configured to operate in a sleep mesh mode and sleep except replying to the backbone nodes' queries and requests by comparing UUID received and stored in memories of the tracking nodes.

2. The system of claim 1, wherein when taken away from its position or restored back to its position, and falling into any backbone node's covered area, each tracking node is configured to switch into an actively listening mesh mode, in which the tracking node is configured to simultaneously listen to any backbone node's broadcast and attempt to establish connections with any backbone node in order to send its UUID back to the monitoring device.

3. The system of claim 2, wherein if time that the tracking node has stayed in the actively listening mesh mode exceeds a limit, and the tracking node still cannot find a nearby backbone node, the tracking node is configured to switch itself into beacon mode and actively broadcast its UUID seeking to be found by the monitoring device.

4. The system of claim 3, wherein the backbone nodes are configured to operate in mesh mode and beacon mode simultaneously; each backbone node comprises two BLE devices which work in mesh mode and beacon mode respectively; the two BLE devices share a same memory that contains UUID; and a memory lock control signal is used to ensure that only one BLE device can access the memory at one time.

5. The system of claim 3, wherein the backbone nodes are configured to automatically switch between mesh mode and beacon mode with a predefined time pattern; each backbone node comprises only one BLE device; the BLE device comprises a protocol stack that is compatible with both Bluetooth mesh protocol and Bluetooth beacon protocol.

6. The system of claim 5, wherein the backbone nodes are configured to communicate with each other through a synchronization method, the method comprising:
the monitoring device sending out a switch signal to the closest backbone node to switch the closest backbone node to mesh mode;
the closest backbone node sending the switch signal to a next backbone node to switch the next backbone node to mesh mode; and
when the monitoring device has received an updated UUID table from the closest backbone node, the monitoring device sending another switch signal to switch all backbone nodes to beacon mode.

7. The system of claim 5, wherein the backbone nodes are configured to communicate with each other through a synchronization method, the method comprising:
the monitoring device sending out a switch or training sequence signal to the closest backbone node to switch the closest backbone node to mesh mode;
the closest backbone node sending the switch or training sequence signal to a next backbone node to switch the next backbone node to mesh mode;
synchronizing clocks in all backbone nodes with the switch or training sequence signal; and
after a predefined time, automatically changing all backbone nodes back to beacon mode.

8. A locating and tracking system comprising:
at least one monitoring device; and
a plurality of Bluetooth low energy (BLE) devices acting as either backbone nodes or tracking nodes; wherein:
the backbone nodes are connected with each other and form a mesh network to relay information to the monitoring device in mesh mode so that the monitoring device knows all the backbone nodes' presence and locations;
each backbone node is further connected with a plurality of tracking nodes to form a sub-network;
within the sub-network, the backbone node is configured to operate in beacon mode to periodically check presence of all the tracking nodes and other compatible BLE devices within its coverage; and
the backbone nodes are configured to switch between mesh mode and beacon mode.

9. The system of claim 8, wherein the backbone nodes are configured to operate in mesh mode and beacon mode simultaneously; each backbone node comprises two BLE devices which work in mesh mode and beacon mode respectively; the two BLE devices share a same memory that contains UUID; and a memory lock control signal is used to ensure that only one BLE device can access the memory at one time.

10. The system of claim 8, wherein the backbone nodes are configured to automatically switch between mesh mode and beacon mode with a predefined time pattern; each backbone node comprises only one BLE device; the BLE device comprises a protocol stack that is compatible with both Bluetooth mesh protocol and Bluetooth beacon protocol.

11. A locating and tracking system comprising:
at least one monitoring device; and
a plurality of Bluetooth low energy (BLE) devices acting as either backbone nodes or tracking nodes; wherein:
the backbone nodes are connected with each other and form a mesh network to relay information to the monitoring device in mesh mode so that the monitoring device knows all the backbone nodes' presence and locations;
each backbone node is further connected with a plurality of tracking nodes to form a sub-network; and
within the sub-network, the backbone node is configured to operate in beacon mode to periodically check presence of all the tracking nodes and other compatible BLE devices within its coverage.

12. The system of claim 11, wherein the tracking nodes are equipped with sensors, switches, buzzers, or lights.

13. The system of claim 11, wherein when being in mesh mode, the backbone nodes are configured to relay information to other backbone nodes until the information reaches the monitoring device; when being in beacon mode, the backbone nodes are configured to actively broadcast their own universal unique identifiers (UUIDs) and seek to establish connections with all BLE devices within its range; and the backbone nodes are configured to store the UUIDs of all devices detected in their memories.

14. The system of claim 11, wherein the tracking nodes are configured to operate in a sleep mesh mode and sleep except replying to the backbone nodes' queries and requests by comparing UUID received and stored in memories of the tracking nodes.

15. The system of claim 14, wherein when taken away from its position or restored back to its position, and falling into any backbone node's covered area, each tracking node is configured to switch into an actively listening mesh mode, in which the tracking node is configured to simultaneously listen to any backbone node's broadcast and attempt to establish connections with any backbone node in order to send its UUID back to the monitoring device.

16. The system of claim 15, wherein if time that the tracking node has stayed in the actively listening mesh mode exceeds a limit, and the tracking node still cannot find a nearby backbone node, the tracking node is configured to switch itself into beacon mode and actively broadcast its UUID seeking to be found by the monitoring device.

17. The system of claim 16, wherein the backbone nodes are configured to operate in mesh mode and beacon mode simultaneously; each backbone node comprises two BLE devices which work in mesh mode and beacon mode respectively; the two BLE devices share a same memory that contains UUID; and a memory lock control signal is used to ensure that only one BLE device can access the memory at one time.

18. The system of claim 16, wherein the backbone nodes are configured to automatically switch between mesh mode and beacon mode with a predefined time pattern; each backbone node comprises only one BLE device; the BLE device comprises a protocol stack that is compatible with both Bluetooth mesh protocol and Bluetooth beacon protocol.

19. The system of claim 18, wherein the backbone nodes are configured to communicate with each other through a synchronization method, the method comprising:
   the monitoring device sending out a switch signal to the closest backbone node to switch the closest backbone node to mesh mode;
   the closest backbone node sending the switch signal to a next backbone node to switch the next backbone node to mesh mode; and
   when the monitoring device has received an updated UUID table from the closest backbone node, the monitoring device sending another switch signal to switch all backbone nodes to beacon mode.

20. The system of claim 18, wherein the backbone nodes are configured to communicate with each other through a synchronization method, the method comprising:
   the monitoring device sending out a switch or training sequence signal to the closest backbone node to switch the closest backbone node to mesh mode;
   the closest backbone node sending the switch or training sequence signal to a next backbone node to switch the next backbone node to mesh mode;
   synchronizing clocks in all backbone nodes with the switch or training sequence signal; and
   after a predefined time, automatically changing all backbone nodes back to beacon mode.

* * * * *